(12) United States Patent
Firko et al.

(10) Patent No.: US 9,144,948 B2
(45) Date of Patent: Sep. 29, 2015

(54) HAT STIFFENERS WITH CANTED WEBS

(75) Inventors: Jason Lawrence Firko, Wilmington, DE (US); Martin G. Andrews, Chadds Ford, PA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/439,403

(22) Filed: Apr. 4, 2012

(65) Prior Publication Data

US 2013/0264421 A1   Oct. 10, 2013

(51) Int. Cl.
*B64C 1/06* (2006.01)
*B29D 99/00* (2010.01)

(52) U.S. Cl.
CPC ............ *B29D 99/0003* (2013.01); *B64C 1/064* (2013.01); *Y10T 29/49826* (2015.01); *Y10T 428/1241* (2015.01); *Y10T 428/24628* (2015.01)

(58) Field of Classification Search
CPC ................ E04C 2003/0473; E04C 2003/0443; E04C 3/07; B29C 99/00–99/99; B64C 3/182; B64C 1/064
USPC ............ 428/98, 174, 411.1, 603; 244/117 R; 264/219; 29/428; 52/843, 846, 852
See application file for complete search history.

(56) References Cited

U.S. PATENT DOCUMENTS

| | | | |
|---|---|---|---|
| 5,303,528 A * | 4/1994 | Simpson et al. | 52/640 |
| 7,134,629 B2 | 11/2006 | Johnson et al. | |
| 7,871,040 B2 | 1/2011 | Lee et al. | |
| 2004/0091674 A1 * | 5/2004 | Altshuler | 428/174 |
| 2005/0077427 A1 * | 4/2005 | Brenner et al. | 244/117 R |
| 2008/0290214 A1 | 11/2008 | Guzman et al. | |
| 2009/0127393 A1 | 5/2009 | Guzman et al. | |
| 2010/0139850 A1 | 6/2010 | Morris et al. | |
| 2010/0304094 A1 | 12/2010 | Brook et al. | |
| 2013/0020438 A1 * | 1/2013 | Glynn et al. | 244/129.1 |

FOREIGN PATENT DOCUMENTS

WO     2008133748 A2    6/2008
WO  WO2008/133748 A2  11/2008

OTHER PUBLICATIONS

PCT International Search Report and Written Opinion of the International Searching Authority for Counterpart International Application No. PCT/US2013/025141, ISR Mailed Apr. 26, 2013, Applicant The Boeing Company, 11 pages.
PCT International Preliminary Report on Patentability and Written Opinion of the International Searching Authority for Counterpart International Application No. PCT/US2013/025141, ISR Mailed Oct. 16, 2014, Applicant The Boeing Company, 8 pages.

* cited by examiner

*Primary Examiner* — Maria Veronica Ewald
*Assistant Examiner* — Brian Handville (57) ABSTRACT

In an embodiment of the disclosure, there is provided a hat stiffener. The hat stiffener has a cap. The hat stiffener further has a first web and a second web extending from opposite ends of the cap. The first web and the second web are non-linear and include at least one canted portion. The hat stiffener further has a first flange extending outwardly from a first web base portion and a second flange extending outwardly from a second web base portion.

16 Claims, 7 Drawing Sheets

HAT STIFFENERS WITH CANTED WEBS

BACKGROUND

1) Field of the Disclosure

The disclosure relates generally to structural parts and the production of structural parts, and more specifically, to hat stiffener configurations and methods used in forming stiffened panel structures such as used in aircraft.

2) Description of Related Art

Composite and metal structures are used in a wide variety of applications. In aircraft construction, composites and metals are typically used to form the fuselage, wings, tail section and other aircraft components. For example, aircraft fuselage may be formed of stiffened panel structures having skin panel structures constructed of composite or metal to which stiffening elements, such as stringers, may be coupled to improve the strength, stiffness and stability of the skin panel structures. The stringers may be bonded or attached to the skin panel structures and may be configured to carry various loads. In addition, aircraft may incorporate stiffening elements, such as stringers, in the wings, where the stringers may be coupled to the skin panel structures in order to form upper and lower surfaces of the wings.

Stiffening elements, such as stringers, may be provided in a wide variety of cross-sectional shapes. For example, a stringer may comprise a hat stiffener made of a metal material or a plurality of composite plies and having a cross-section with a hat-shaped configuration. The hat stiffener may have a cap, a pair of webs where each web extends from opposite ends of the cap, and a pair of flanges where each flange extends outwardly from a base portion of each web. The flanges may facilitate coupling of the stringer to the skin panel structure.

The design of stiffened panel structures, such as those reinforced with hat stiffeners, may be limited in performance and/or weight efficiency by the stability of the webs of the hat stiffener. For example, to achieve greater bending stiffness of the stiffened panel structure, it may be beneficial to offset the cap of the hat stiffener farther away from the skin panel structure. However, as the webs of the hat stiffener which support the cap get taller, they may become more prone to instability, such as by buckling. Thus, web stability of the hat stiffener may be a limiting factor in the design and optimization of stiffened panel structures, such as those reinforced with hat stiffeners.

Methods and systems exist for designing and sizing stiffened panel structures reinforced with hat stiffeners. For example, one known method includes limiting the height of the webs of the hat stiffener. However, the bending efficiency of the stiffened panel structure may be related to the relative height of the webs of the hat stiffener. Therefore, by limiting the height of the webs, potential bending efficiency may, in turn, be limited.

Another known method for designing and sizing stiffened panel structures reinforced with hat stiffeners includes increasing the thickness of the entire hat stiffener or increasing the thickness of the webs of the hat stiffener. However, increasing the thickness of the entire hat stiffener or even just the webs of the hat stiffener may not be the most weight efficient method for generating buckling or crippling resistance, such that the end result may be a design with a considerable strength margin but with a minimal or zero stability margin. Such design may result in increased overall weight of the stiffened panel structures which may, in turn, result in increased fuel costs and decreased vehicle efficiency.

Further, another known method for designing and sizing stiffened panel structures reinforced with hat stiffeners includes decreasing the cap angle, that is, the angle formed between the cap and each web, which may increase the steepness of each web. Decreasing such cap angle may also decrease the length of each web necessary to achieve a particular offset of the cap in relation to the skin panel structure of the stiffened panel structure. However, this may be less effective as the cap angle approaches 90 degrees. Moreover, as the webs become steeper, the shear path between the cap and skin panel structure may be compromised which may, in turn, lead to radius opening issues if the stiffened panel structure is loaded in shear.

Accordingly, there is a need in the art for an improved hat stiffener and method that provide advantages over known designs and methods.

SUMMARY

This need for an improved hat stiffener and method is satisfied. As discussed in the below detailed description, embodiments of the improved hat stiffener and method may provide significant advantages over known designs and methods.

In an embodiment of the disclosure, there is provided a hat stiffener. The hat stiffener comprises a cap. The hat stiffener further comprises a first web and a second web extending from opposite ends of the cap. The first web and the second web are non-linear and include at least one canted portion. The hat stiffener further comprises a first flange extending outwardly from a first web base portion and a second flange extending outwardly from a second web base portion.

In another embodiment of the disclosure, there is provided a hat stiffened panel structure for an aircraft. The hat stiffened panel structure comprises a skin panel structure. The hat stiffened panel structure further comprises a hat stiffener mounted to the skin panel structure. The hat stiffener comprises a cap. The hat stiffener further comprises a first web and a second web extending from opposite ends of the cap. The first web and the second web are non-linear and include at least one canted portion. The hat stiffener further comprises a first flange extending outwardly from a first web base portion and a second flange extending outwardly from a second web base portion.

In another embodiment of the disclosure, there is provided a method of forming a composite hat stiffener with canted webs made of a composite material. The method comprises integrally machining into a tooling surface of a hat tool, a hat tool substantially hat-shaped cross-section configuration comprising a cap, a first web and a second web each extending from opposite ends of the cap, wherein both the first web and the second web are non-linear and include at least one canted portion, and a first flange extending outwardly from a first web base portion and a second flange extending outwardly from a second web base portion. The method further comprises forming a hat stiffener by laying up composite plies on the tooling surface of the hat tool. The hat stiffener is formed with a hat stiffener substantially hat-shaped cross-section configuration corresponding to the hat tool substantially hat-shaped cross-section configuration. The method further comprises inserting a mandrel in a hat stiffener cavity of the hat stiffener. The method further comprises curing the hat stiffener to form a hat stiffener made of a composite material with at least one canted portion formed in both a first web and a second web. The method further comprises removing the hat stiffener from the hat tool.

In another embodiment of the disclosure, there is provided a method of forming a hat stiffener with canted webs made of a metal material. The method comprises integrally machining into a tooling surface of a hat tool a hat tool substantially hat-shaped cross-section configuration comprising a cap, a first web and a second web each extending from opposite ends of the cap, wherein both the first web and the second web are non-linear and include at least one canted portion, and a first flange extending outwardly from a first web base portion and a second flange extending outwardly from a second web base portion. The method further comprises forming a hat stiffener by deforming a metal sheet on the tooling surface of the hat tool. The hat stiffener is formed with a hat stiffener substantially hat-shaped cross-section configuration corresponding to the hat tool substantially hat-shaped cross-section configuration, wherein the hat stiffener is made of a metal material with at least one canted portion formed in both a first web and a second web. The method further comprises removing the hat stiffener from the hat tool.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
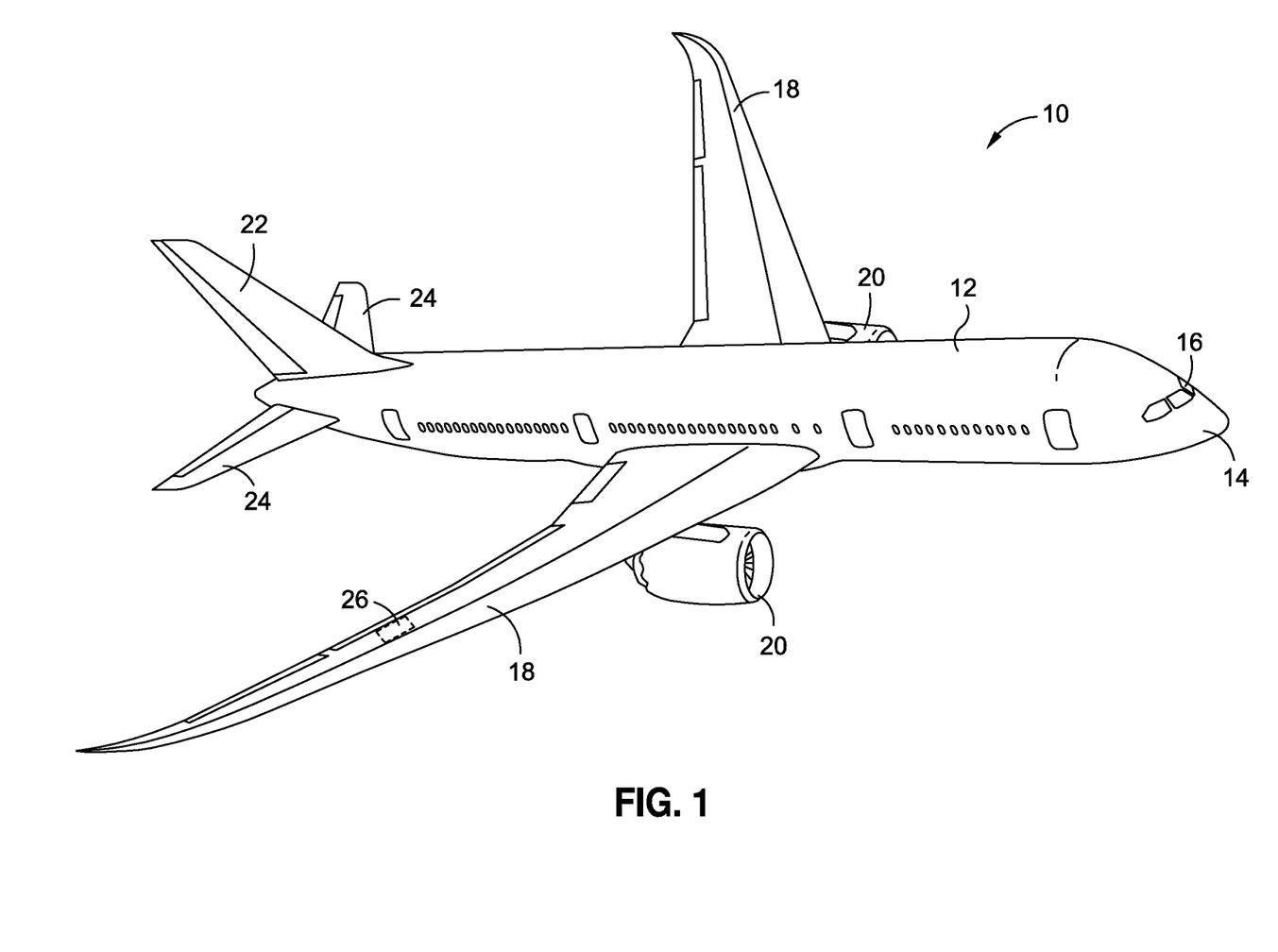
FIG. 1 is an illustration of a perspective view of an aircraft that may incorporate one or more exemplary embodiments of a hat stiffener with canted webs in a hat stiffened panel structure of the aircraft.

Now referring to the Figures, FIG. 1 is an illustration of a perspective view of an aircraft 10 that may incorporate one or more exemplary embodiments of a hat stiffener with canted webs in a hat stiffened panel structure 26 of the aircraft 10. As shown in FIG. 1, the aircraft 10 comprises a fuselage 12, a nose 14, a cockpit 16, wings 18, one or more propulsion units 20, a vertical tail portion 22, and horizontal tail portions 24. Although the aircraft 10 shown in FIG. 1 is generally representative of a commercial passenger aircraft having one or more hat stiffened panel structures 26, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles, as well as boats and other watercraft, trains, automobiles, trucks, buses, or other suitable structures having one or more hat stiffened panel structures 26.

Figure 2A:
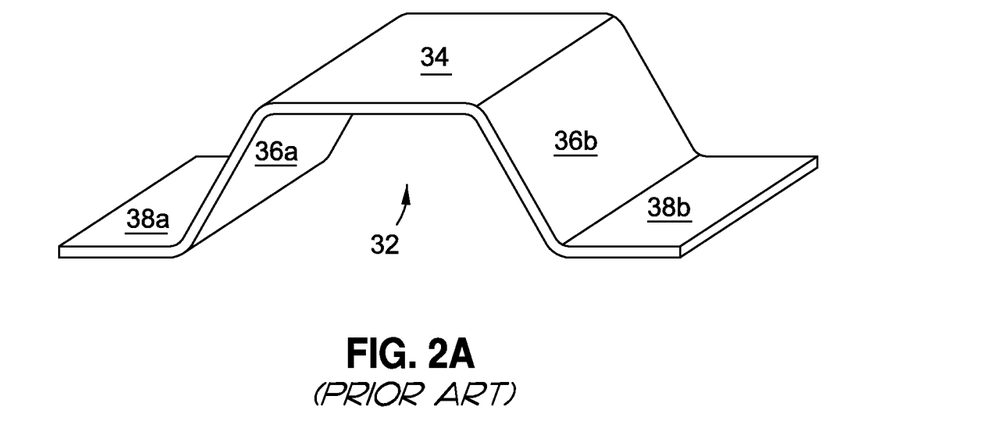
FIG. 2A is an illustration of a perspective view of a known web hat stiffener.
Figure 2B:
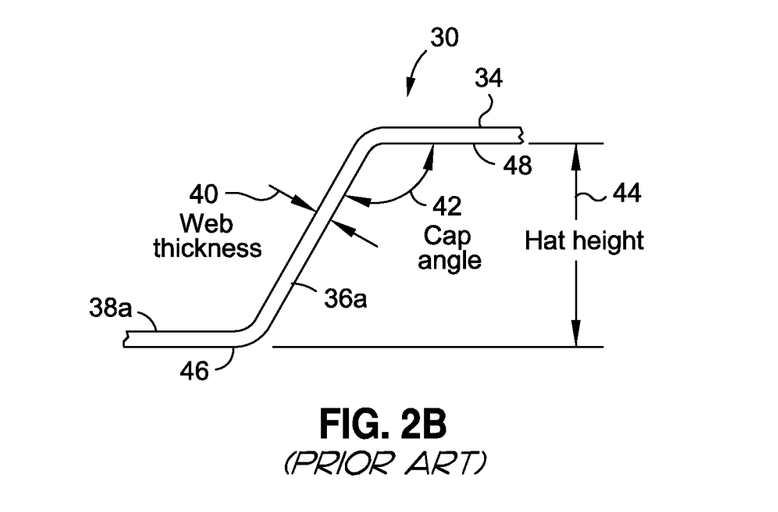
FIG. 2B is an illustration of a front end view of the known web hat stiffener of FIG. 2A.

FIG. 2A is an illustration of a perspective view of a known web hat stiffener 30. As shown in FIG. 2A, the known web hat stiffener 30 has a hat-shaped cross-section configuration 32. The known web hat stiffener 30 has a cap 34, a pair of webs 36a, 36b extending from the cap 34, and a pair of flanges 38a, 38b extending outwardly from the pair of webs 36a, 36b, respectively. FIG. 2B is an illustration of a front end view of the known web hat stiffener 30 of FIG. 2A. FIG. 2B shows a web thickness 40, a cap angle 42, and a hat height 44 of the known web hat stiffener 30. The hat height 44 is measured from a bottom surface 46 of the flange 38a to an interior surface 48 of the cap 34. The web 36a is linear.

Figure 3A:
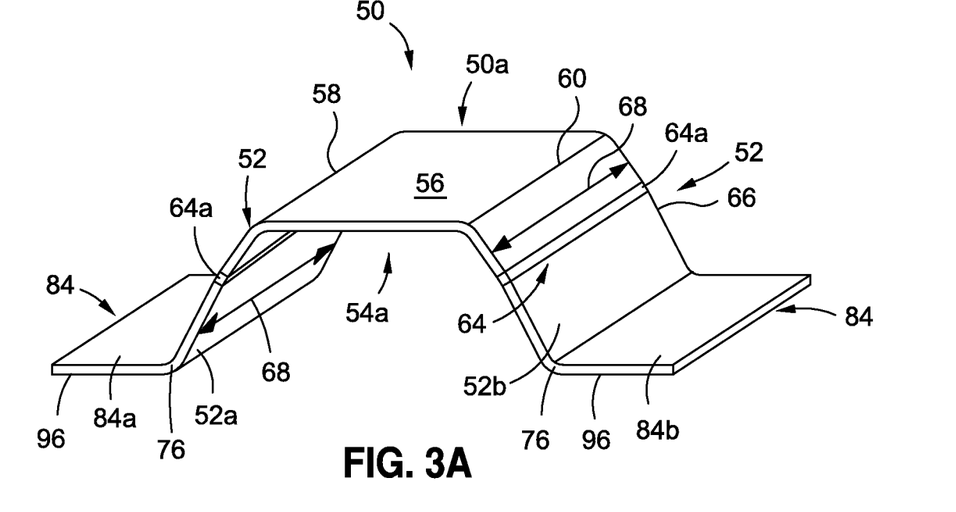
FIG. 3A is an illustration of a perspective view of one of the embodiments of a hat stiffener with canted webs of the disclosure.

FIG. 3A is an illustration of a perspective view of one of the embodiments of a hat stiffener 50, such as in the form of hat stiffener 50a, with a pair of canted webs 52, such as in the form of a first web 52a and a second web 52b. As shown in FIG. 3A, the hat stiffener 50 preferably has a substantially hat-shaped cross-section configuration 54a. The hat stiffener 50, in the form of hat stiffener 50a, comprises a cap 56. The cap 56 has a first end 58 and a second end 60.

The hat stiffener 50, in the form of hat stiffener 50a, further comprises canted webs 52, such as in the form of first web 52a and second web 52b. The first web 52a and the second web 52b extend from opposite first and second ends 58, 60, respectively, of the cap 56. The first web 52a and the second web 52b are non-linear and have a non-linear configuration 62 (see FIG. 3B). Both the first web 52a and the second web 52b include at least one canted portion 64. In one embodiment, as shown in FIG. 3A, both the first web 52a and the second web 52b have a first canted portion 64a formed at a central portion 66 along a length 68 of the first web 52a and the second web 52b. The first canted portion 64a divides each of the first web 52a and the second web 52b into two sections 70, 72 (see FIG. 3B). Both the first web 52a and the second web 52b each have a top portion 74 (see FIG. 3B) and a base portion 76 (see FIG. 3B).

Figure 3B:
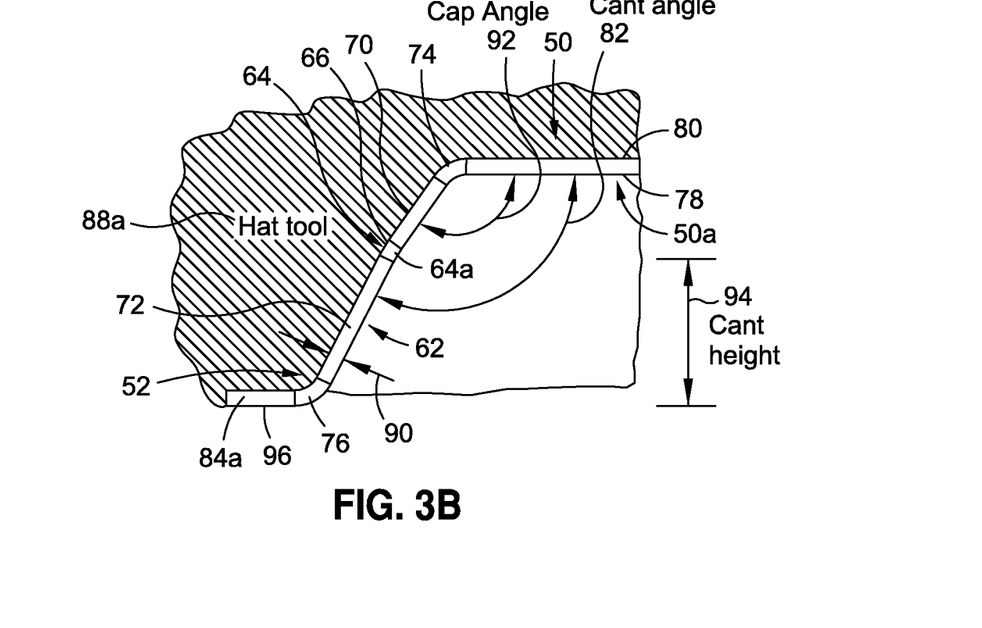
FIG. 3B is an illustration of a front end view of the hat stiffener with canted webs of FIG. 3A shown adjacent a hat tool.

The at least one canted portion 64 preferably has a cant angle 82 (see FIG. 3B) formed between an interior surface 78 (see FIG. 3B) of the hat stiffener 50 at the cap 56 and the at least one canted portion 64, such as the first canted portion 64a of the first web 52a, and in particular, section 72 of the first web 52a (see FIG. 3B). The cant angle 82 is preferably greater than ninety (90) degrees, so that the hat stiffener 50 may be removed from a hat tool 88*a* (see FIG. 3B) during formation or manufacture of the hat stiffener 50. More preferably, the cant angle 82 is between ninety (90) degrees and one-hundred eighty (180) degrees. The cap angle 92 (see FIG. 3B) may be greater than the cant angle 82 (see FIG. 3B), such that a difference between the cap angle 92 measurement and the cant angle 82 measurement creates the canted portion 64 that acts as a stability feature. Alternatively, the cap angle 92 may be less than the cant angle 82, such that a difference between the cap angle 92 measurement and the cant angle 82 measurement also creates the canted portion 64 that acts as a stability feature. The cant angle 82 chosen may depend on loads applied to the hat stiffened panel structure 26 (see FIGS. 1, 5) comprising the hat stiffener 50 mounted to a skin panel structure 86 (see FIG. 5).

As shown in FIG. 3A, the hat stiffener 50, in the form of hat stiffener 50*a*, further comprises a pair of flanges 84, such as in the form of a first flange 84*a* and a second flange 84*b*. The first flange 84*a* extends outwardly from the base portion 76 (see also FIG. 3B) of the first web 52*a*. The second flange 84*b* extends outwardly from the base portion 76 (see also FIG. 3B) of the second web 52*b*. The first and second flanges 84*a*, 84*b* each have a bottom surface 96 (see also FIG. 3B) to facilitate mounting (e.g., bonding or attaching) of the hat stiffener 50 to a skin panel structure 86 (see FIG. 5).

FIG. 3B is an illustration of a front end view of the hat stiffener 50, such as hat stiffener 50*a*, with the canted web 52 shown adjacent a hat tool 88*a*. FIG. 3B shows the first web 52*a* with the first canted portion 64*a*, the non-linear configuration 62, and a web thickness 90. FIG. 3B further shows a cap angle 92 formed between the interior surface 78 of the hat stiffener 50 at the cap 56 and the interior surface 78 of the hat stiffener 50 at the first web 52*a*, such as at section 70 of the first web 52*a*. FIG. 3B further shows the cant angle 82, as discussed above, and a cant height 94. The cant height 94 is measured from the bottom surface 96 of the first flange 84*a* to the first canted portion 64*a*. FIG. 3B further shows an exterior surface 80 of the hat stiffener 50 adjacent the hat tool 88*a*.

Figure 4A:
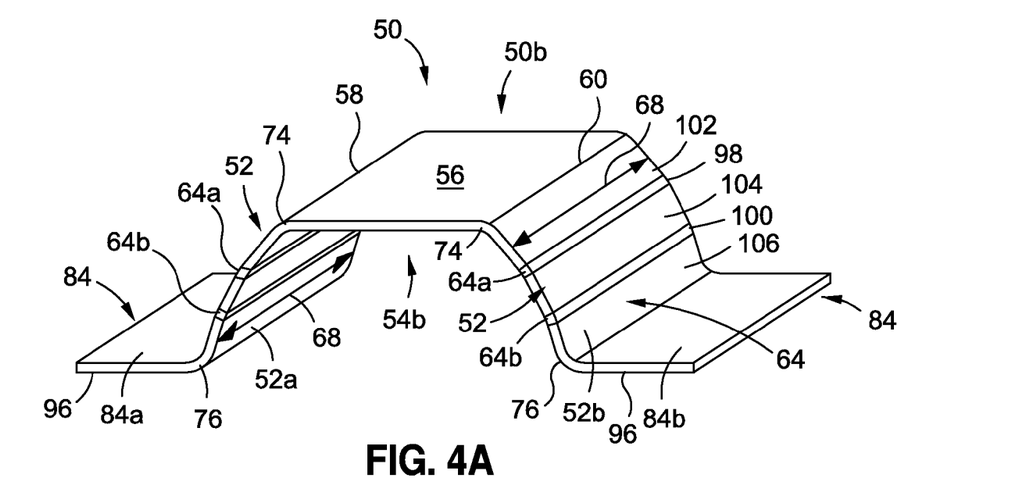
FIG. 4A is an illustration of a perspective view of another one of the embodiments of a hat stiffener with canted webs of the disclosure.

FIG. 4A is an illustration of a perspective view of another one of the embodiments of a hat stiffener 50, such as in the form of hat stiffener 50*b*, with a pair of canted webs 52. This embodiment of the hat stiffener 50*b* has similar features to the hat stiffener 50*a* shown in FIG. 3A, except in this embodiment, the first web 52*a* and second web 52*b* each have two canted portions 64, such as in the form of first canted portion 64*a* and second canted portion 64*b*. Both the first web 52*a* and the second web 52*b* each have a top portion 74 (see also FIG. 4B) and a base portion 76 (see also FIG. 4B). As shown in FIG. 4A, the hat stiffener 50 preferably has a substantially hat-shaped cross-section configuration 54*b*. The hat stiffener 50, in the form of hat stiffener 50*b*, comprises a cap 56. The cap 56 has a first end 58 and a second end 60.

As further shown in FIG. 4A, the first web 52*a* and the second web 52*b* each extend from opposite first and second ends 58, 60, respectively, of the cap 56. Both the first web 52*a* and the second web 52*b* are non-linear and include two canted portions 64. As shown in FIG. 4A, both the first web 52*a* and the second web 52*b* have a first canted portion 64*a* formed at a first portion 98 (see also FIG. 4B) along a length 68 of each of the first web 52*a* and the second web 52*b*, and further have a second canted portion 64*b* formed at a second portion 100 (see also FIG. 4B) along a length 68 of each of the first web 52*a* and the second web 52*b*. The first canted portion 64*a* and the second canted portion 64*b* are preferably formed at first and second portions 98, 100 that are spaced apart from each other along a length 68 of each of the first web 52*a* and the second web 52*b*. The first canted portion 64*a* and the second canted portion 64*b* divide each of the first web 52*a* and the second web 52*b* into three sections 102, 104, and 106, respectively (see also FIG. 4A).

Figure 4B:
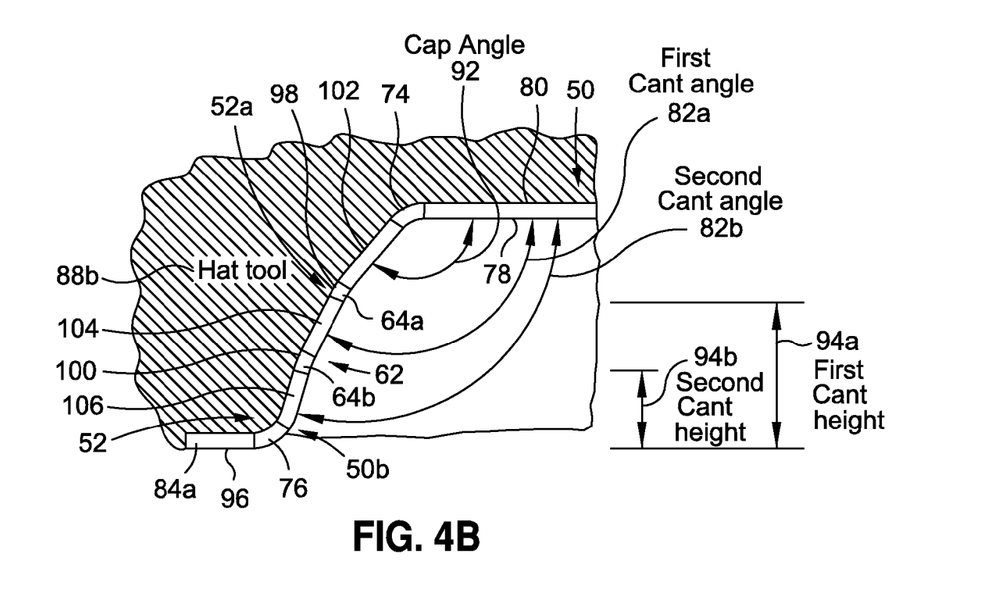
FIG. 4B is an illustration of a front end view of the hat stiffener with canted webs of FIG. 4A shown adjacent a hat tool.

FIG. 4B is an illustration of a front end view of the hat stiffener 50, such as hat stiffener 50*b*, with the canted web 52 shown adjacent a hat tool 88*b*. FIG. 4B shows the first web 52*a* with the first canted portion 64*a*, the second canted portion 64*b*, and the non-linear configuration 62. FIG. 4B further shows a cap angle 92 formed between the interior surface 78 of the hat stiffener 50 at the cap 56 and the interior surface 78 of the hat stiffener 50 at the first web 52*a*, such as at section 102 of the first web 52*a*.

FIG. 4B further shows a first cant angle 82*a* formed between the interior surface 78 of the hat stiffener 50 at the cap 56 and the first canted portion 64*a* of the first web 52*a*, and in particular, at section 104 of the first web 52*a*. FIG. 4B further shows a second cant angle 82*b* formed between the interior surface 78 of the hat stiffener 50 at the cap 56 and the second canted portion 64*b* of the first web 52*a*, and in particular, section 106 of the first web 52*a*. The first cant angle 82*a* and the second cant angle 82*b* are preferably each greater than ninety (90) degrees, so that the hat stiffener 50 may be removed from a hat tool 88*b* (see FIG. 4B) during formation or manufacture of the hat stiffener 50. More preferably, the first cant angle 82*a* and the second cant angle 82*b* are between ninety (90) degrees and one-hundred eighty (180) degrees. The cant angle 82 chosen may depend on loads applied to the hat stiffened panel structure 26 (see FIGS. 1, 5) comprising the hat stiffener 50 mounted to a skin panel structure 86 (see FIG. 5).

As further shown in FIG. 4A, the hat stiffener 50, in the form of hat stiffener 50*b*, further comprises a pair of flanges 84, such as in the form of a first flange 84*a* and a second flange 84*b*. The first flange 84*a* extends outwardly from the base portion 76 (see also FIG. 3B) of the first web 52*a*. The second flange 84*b* extends outwardly from the base portion 76 (see also FIG. 3B) of the second web 52*b*. Each of the first and second flanges 84*a*, 84*b* have a bottom surface 96 (see also FIG. 3B) to facilitate mounting (e.g., bonding or attaching) of the hat stiffener 50 to a skin panel structure 86 (see FIG. 5).

FIG. 4B further shows a first cant height 94*a* and a second cant height 94*b*. The first cant height 94*a* is measured from the bottom surface 96 of the first flange 84*a* to the first canted portion 64*a*. The second cant height 94*b* is measured from the bottom surface 96 of the first flange 84*a* to the second canted portion 64*b*. The exterior surface 80 of the hat stiffener 50 is adjacent the hat tool 88*b*.

The hat stiffener 50, such as in the form of hat stiffener 50*a* (see FIG. 3A) and hat stiffener 50*b* (see FIG. 4A) may be made of a material comprising a composite material, a metal material, a combination of a composite material and a metal material, or another suitable material. The composite material may comprise prepreg plies of composite material, such as woven fabric or uni-directional tape, which may be made of graphite, aromatic polyamide fiber, fiberglass, epoxy, or another suitable composite material. The metal material may comprise a lightweight aluminum, titanium, steel or another suitable metal material. If the hat stiffener 50 is a hat stiffener made of a composite material, the at least one canted portion 64 is preferably formed when the hat stiffener 50 undergoes a curing process during formation or manufacture of the hat stiffener 50, discussed in further detail below.

Figure 5:
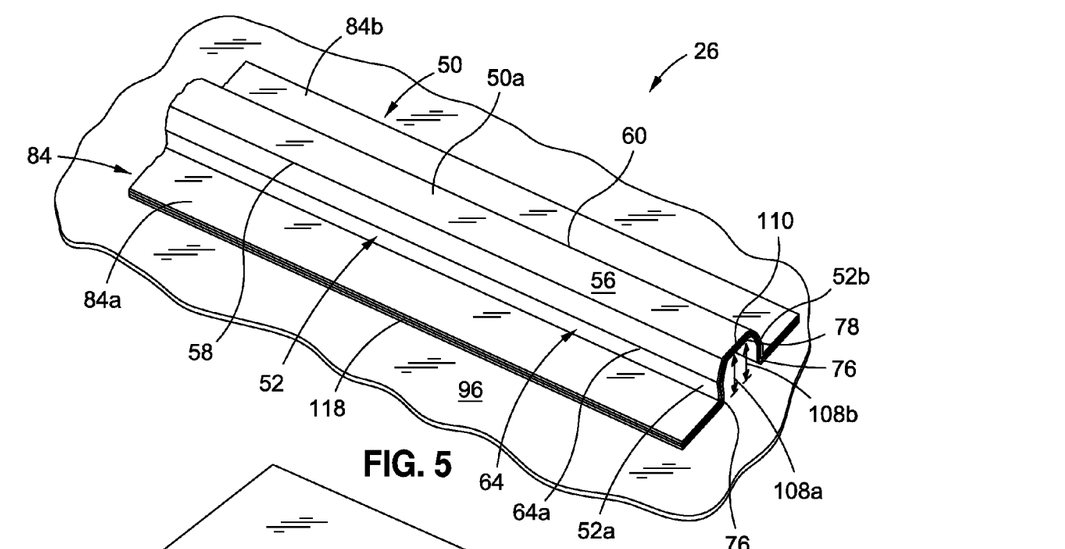
FIG. 5 is an illustration of a perspective view of one of the embodiments of a hat stiffener with canted webs mounted to a skin panel structure.

In another embodiment of the disclosure, there is provided a hat stiffened panel structure 26 (see FIGS. 1, 5) for an aircraft 10 (see FIG. 1). FIG. 5 is an illustration of a perspective view of one of the embodiments of a hat stiffener 50, such as in form of hat stiffener 50*a*, with canted webs 52, such as in the form of first web 52a and second web 52b, mounted to a skin panel structure 86. As shown in FIG. 5, the hat stiffened panel structure 26 comprises a skin panel structure 86. The hat stiffened panel structure 26 further comprises a hat stiffener 50, such as in the form of hat stiffener 50a, mounted to the skin panel structure 86 at the first flange 84a and the second flange 84b. As discussed above, the hat stiffener 50, such as in the form of hat stiffener 50a, comprises a cap 56. The hat stiffener 50, such as in the form of hat stiffener 50a, further comprises a first web 52a and a second web 52b extending from opposite first and second ends 58, 60, respectively, of the cap 56. The first web 52a and the second web 52b are non-linear and include at least one canted portion 64. The hat stiffener 50, such as in the form of hat stiffener 50a, further comprises the first flange 84a and the second flange 84b both extending outwardly from the base portion 76 of the first web 52a and the second web 52b, respectively.

The hat stiffener 50, such as in the form of hat stiffener 50a (see FIG. 3A) and hat stiffener 50b (see FIG. 4A) defines a substantially hat-shaped cross-section configuration 54a (see FIG. 3A), 54b (see FIG. 4A) that improves stability, strength, and buckling resistance of the first web 52a and the second web 52b. The first flange 84a and the second flange 84b of the hat stiffener 50, such as in the form of hat stiffener 50a (see FIG. 3A) and hat stiffener 50b (see FIG. 4A), may be mounted to the skin panel structure 86 (see FIG. 5). As shown in FIG. 5, the hat stiffened panel structure 26 (see also FIG. 1) preferably has a first web height 108a from the skin panel structure 86 to the interior surface 78 of the cap 56, a second web height 108b from the skin panel structure 86 to the interior surface 78 of the cap 56, and a cap offset 110 offset from the skin panel structure 86 that are all greater as compared to existing or known web heights and cap offset of stiffened panel structures. Such greater first web height 108a, second web height 108b and cap offset 110 may result in improved weight efficiency of the hat stiffened panel structure 26.

For a known web hat stiffener 30 (see FIG. 2A), a critical buckling displacement was calculated to be 0.2317 inch. With the hat stiffener 50, such as in the form of hat stiffener 50a (see FIG. 3A), having at least one canted portion 64, a critical buckling displacement was calculated to be 0.2501 inch, which is an 8% increase over the critical buckling displacement of the known web hat stiffener 30. Thus, the hat stiffener 50, such as in the form of hat stiffener 50a, was shown to have improved buckling resistance. The improved buckling resistance may be altered or increased by changing the cant angle 82 and/or number of canted portions 64.

Figure 6:
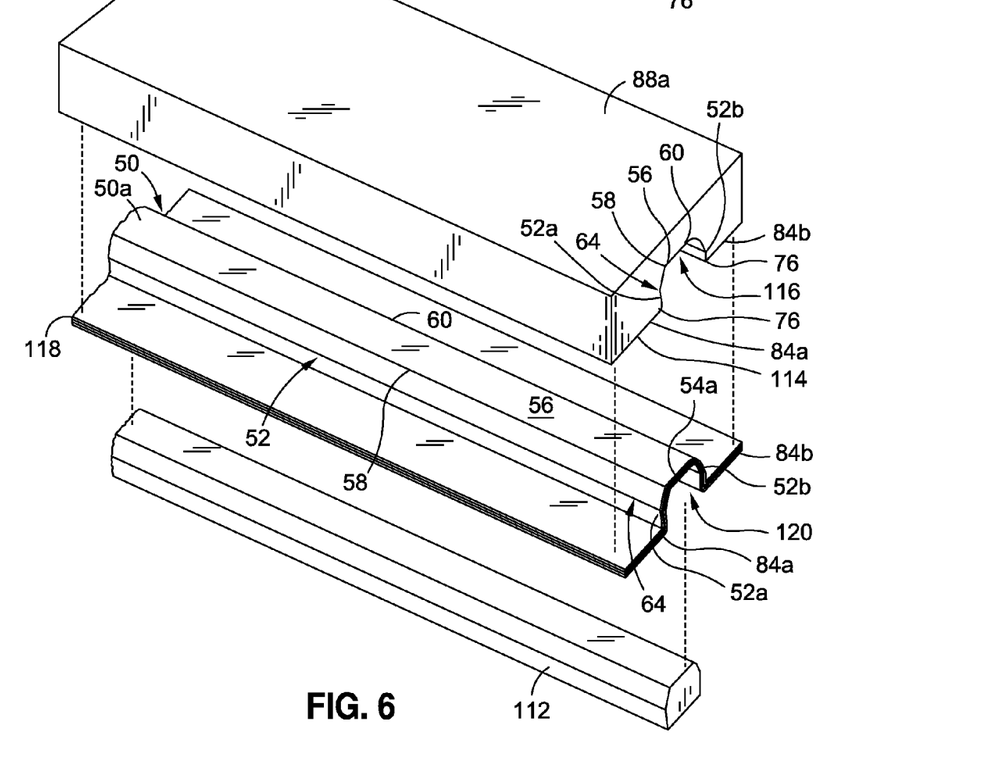
FIG. 6 is an illustration of an exploded perspective view of a hat tool, a hat stiffener, and a mandrel that may be used in the formation of embodiments of a hat stiffener with canted webs of the disclosure.
Figure 7:
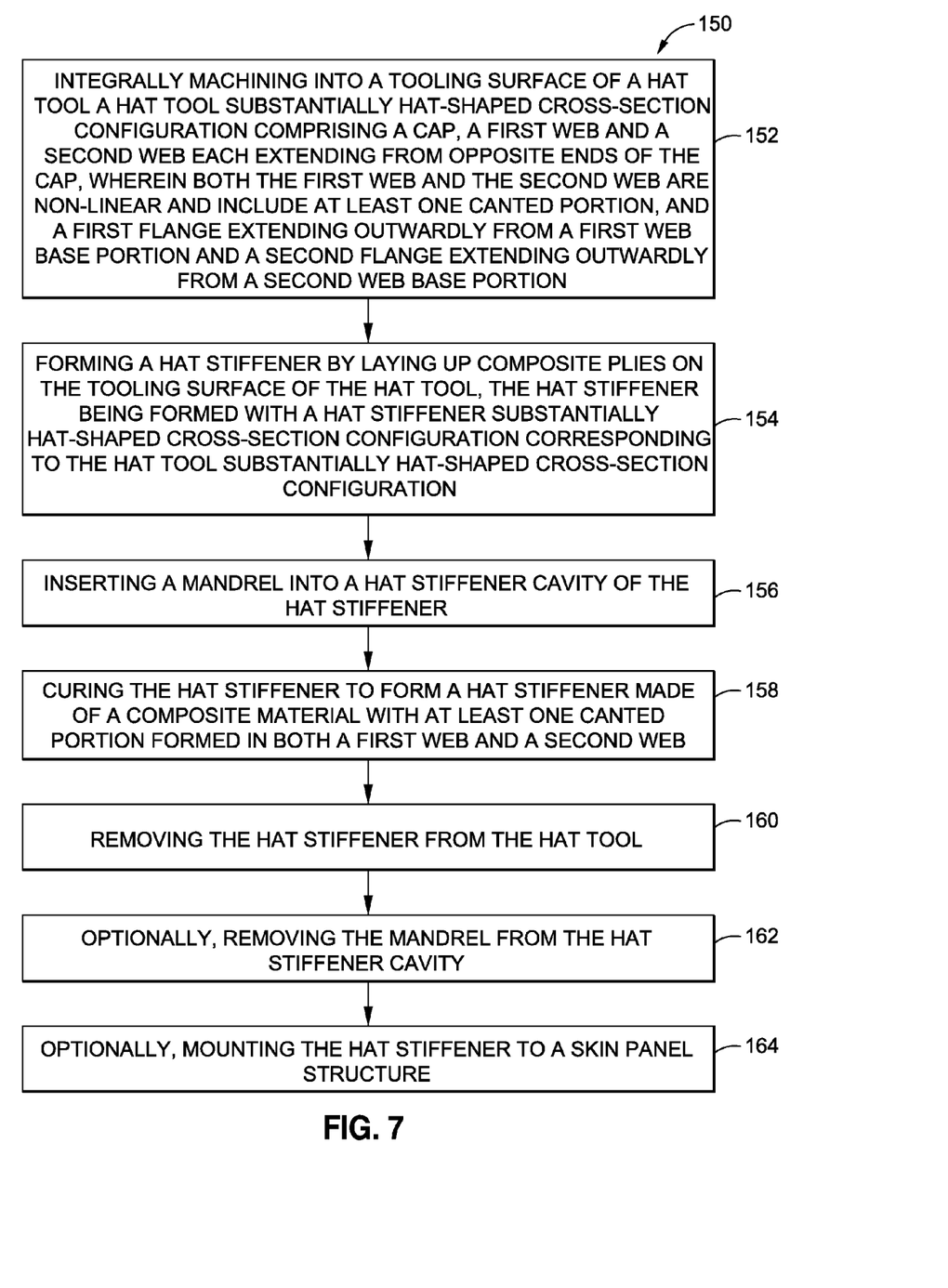
FIG. 7 is an illustration of a flow diagram of one of the embodiments of a method of the disclosure; and, FIG. 8 is an illustration of a flow diagram of another one of the embodiments of a method of the disclosure.
Figure 8:
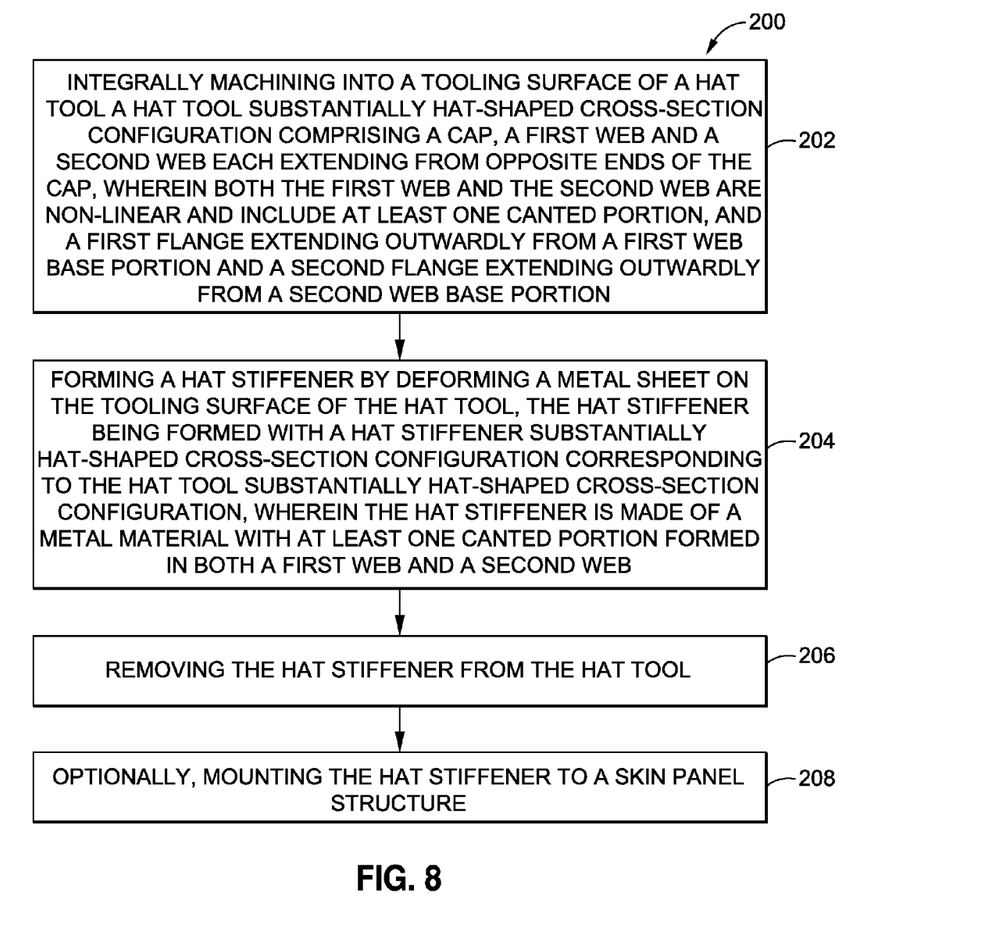

In other embodiments of the disclosure, there are provided a method 150 (see FIG. 7) and a method 200 (see FIG. 8) of forming a hat stiffener 50, such as in the form of hat stiffener 50a (see FIG. 3A) or hat stiffener 50b (see FIG. 3B), with canted webs 52, where the hat stiffener 50 may be a composite material (see FIG. 7) or a metal material (see FIG. 8). FIG. 6 is an illustration of an exploded perspective view of a hat tool 88a, a hat stiffener 50, such as in the form of hat stiffener 50a made of a composite material, and a mandrel 112 that may be used in the formation or manufacture of embodiments of a hat stiffener 50 with canted webs 52 of the disclosure. FIG. 7 is an illustration of a flow diagram of one of the embodiments of the method 150 of forming a hat stiffener 50 (see FIGS. 3A, 4A) with canted webs 52 (see FIGS. 3A, 4A) where the hat stiffener 50 is made of a composite material. FIG. 8 is an illustration of a flow diagram of another one of the embodiments of the method 200 of forming a hat stiffener 50 (see FIGS. 3A, 4A) with canted webs 52 (see FIGS. 3A, 4A) where the hat stiffener 50 is made of a metal material.

As shown in FIG. 7, the method 150 comprises step 152 of integrally machining into a tooling surface 114 (see FIG. 6) of a hat tool 88a (see FIG. 6) a hat tool substantially hat-shaped cross-section configuration 116 (see FIG. 6) comprising a cap 56, a first web 52a and a second web 52b each extending from opposite first and second ends 58, 60 of the cap 56, wherein both the first web 52a and the second web 52b are non-linear and include at least one canted portion 64, and a first flange 84a and second flange 84b both extending outwardly from the base portion 76 of the first web 52a and the second web 52b, respectively.

The method 150 further comprises step 154 of forming a hat stiffener 50 by laying up composite plies 118 (see FIGS. 5 and 6) on the tooling surface 114 of the hat tool 88a (see FIG. 6). The composite plies 118 may be laid up by hand on the tooling surface 114 of the hat tool 88a. Alternatively, the composite plies 118 may be laid up on a flat tooling surface (not shown) by hand or through use of an automatic tape layup machine and then pressed into the hat tool 88a, such as by a process utilizing hot drape forming or another known process, in order to form the composite plies into the shape of the hat stiffener 50. The hat stiffener 50 is preferably formed with a hat stiffener substantially hat-shaped cross-section configuration 54a (see also FIG. 3A) corresponding to the hat tool substantially hat-shaped cross-section configuration 116. The method 150 further comprises step 156 of inserting a mandrel 112 (see FIG. 6) in a hat stiffener cavity 120 (see FIG. 6) of the hat stiffener 50, such as in the form of hat stiffener 50a.

The method 150 further comprises step 158 of curing the hat stiffener 50, such as in the form of hat stiffener 50a, to form a hat stiffener 50, such as in the form of hat stiffener 50a, made of a composite material, with a cap 56, a first web 52a, a second web 52b, and at least one canted portion 64 formed in both the first web 52a and the second web 52b. The curing step 108 may comprise a curing process such as an autoclave curing process, a vacuum bag curing process, a combination autoclave and vacuum bagging curing process, a compression mold curing process, a resin transfer molding process, a room temperature curing process, or another suitable curing process. The curing may take place at an elevated temperature and pressure as required per material specifications to effectively cure the hat stiffener 50.

The method 150 further comprises step 160 of removing the hat stiffener 50 made of the composite material from the hat tool 88a. The at least one canted portion 64 is preferably integrally machined into the tooling surface 114 (see FIG. 6) of the hat tool 88a so as to facilitate ease of removal of the hat stiffener 50 made of the composite material from the hat tool 88a after curing. The method 150 may further comprise after step 160 of removing the hat stiffener 50 made of the composite material from the hat tool 88a, step 162 of removing the mandrel 112 from the hat stiffener cavity 120.

The method 150 may further comprise after step 160 of removing the hat stiffener 50 made of the composite material from the hat tool 88a, step 164 of mounting the hat stiffener 50 made of the composite material with the at least one canted portion 64 formed in both the first web 52a and the second web 52b to a skin panel structure 86 (see FIG. 5). The skin panel structure 86 and the hat stiffener 50 may include composite materials such as graphite-epoxy materials or another composite material, as discussed above, and the hat stiffener 50 may be adhesively bonded to the skin panel structure 86. In this embodiment of the method 150, the hat stiffener 50 may be bonded to the skin panel structure 86 during a co-curing process at an elevated temperature and pressure.

In another embodiment of the disclosure, there is provided a method 200 of forming a hat stiffener 50 (see FIGS. 3A, 4A) with canted webs 52 (see FIGS. 3A, 4A) made of a metal material. FIG. 8 is an illustration of a flow diagram of another one of the embodiments of the method 200 of forming a hat stiffener 50 (see FIGS. 3A, 4A) with canted webs 52 (see FIGS. 3A, 4A) where the hat stiffener 50 is made of a metal material.

As shown in FIG. 8, the method 200 comprises step 202 of integrally machining into a tooling surface 114 (see FIG. 6) of a hat tool 88a (see FIG. 6) a hat tool substantially hat-shaped cross-section configuration 116 (see FIG. 6) comprising a cap 56, a first web 52a and a second web 52b each extending from opposite first and second ends 58, 60 of the cap 56, wherein both the first web 52a and the second web 52b are non-linear and include at least one canted portion 64, and a first flange 84a and second flange 84b both extending outwardly from base portion 76 of the first web 52a and the second web 52b, respectively.

The method 200 further comprises step 204 of forming a hat stiffener 50 by deforming a metal sheet (not shown), such as metal sheets known in the art, on the tooling surface 114 of the hat tool 88a. Alternatively, the hat stiffener 50 may be extruded into the shape of the hat stiffener 50 by pressing the metal sheet (not shown) through a die and placing on the tooling surface 114 of the hat tool 88a. The hat stiffener 50 is formed with a hat stiffener substantially hat-shaped cross-section configuration 54a (see FIGS. 3A, 6) corresponding to the hat tool substantially hat-shaped cross-section configuration 116 (see FIG. 6), wherein the hat stiffener 50 is made of a metal material with at least one canted portion 64 (see FIG. 6) formed in both a first web 52a and a second web 52b. The method 200 further comprises step 206 of removing the hat stiffener 50 from the hat tool 88a.

The method 200 may further comprise after step 206 of removing the hat stiffener 50 made of the metal material from the hat tool 88a, step 208 of mounting the hat stiffener 50 made of the metal material with the at least one canted portion 64 formed in both the first web 52a and the second web 52b to a skin panel structure 86 (see FIG. 5). In this embodiment, the hat stiffener 50 may be riveted or otherwise mechanically attached to the skin panel structure 86 and no curing process is needed.

Disclosed embodiments of the hat stiffener 50 (see FIGS. 3A, 4A), hat stiffener 50a (see FIG. 3A), hat stiffener 50b (see FIG. 4A), method 150 (see FIG. 7) and method 200 (see FIG. 8) provide a hat stiffener with a first web 52a (see FIGS. 3A, 4A) and a second web 52b (see FIGS. 3A, 4A) with increased stability that allows for the design of a more optimal hat stiffener configuration without increasing weight. In addition, disclosed embodiments of the hat stiffener 50 (see FIGS. 3A, 4A), hat stiffener 50a (see FIG. 3A), hat stiffener 50b (see FIG. 4A), method 150 (see FIG. 7) and method 200 (see FIG. 8) provide a substantially hat-shaped cross-section configuration 54a (see FIG. 3A), 54b (see FIG. 4A) and design that improves stability, strength, and buckling resistance of the first web 52a (see FIGS. 3A, 4A) and the second web 52b (see FIGS. 3A, 4A) while utilizing existing or known manufacturing or fabrication technologies. The improved stability, strength, and buckling resistance allow for more optimal hat stiffened panel structures 26 (see FIGS. 1, 5) preferably having a first web height 108a (see FIG. 5) from the skin panel structure 86 (see FIG. 5) to the interior surface 78 (see FIG. 5) of the cap 56, a second web height 108b (see FIG. 5) from the skin panel structure 86 to the interior surface 78 of the cap 56, and a cap offset 110 (see FIG. 5) offset from the skin panel structure 86, that are all greater as compared to web heights and cap offset of existing or known stiffened panel structures. Such greater first web height 108a, second web height 108b, and cap offset 110 may result in improved weight efficiency of the hat stiffened panel structure 26. This may, in turn, provide a reduction in vehicle weight, such as weight of an aircraft 10 (see FIG. 1) and improved structural efficiency. The reduction in weight may be directly related to air vehicle efficiency.

In addition, disclosed embodiments of the hat stiffener 50 (see FIGS. 3A, 4A), hat stiffener 50a (see FIG. 3A), hat stiffener 50b (see FIG. 4A), method 150 (see FIG. 7) and method 200 (see FIG. 8) provide a hat stiffener with at least one canted portion 64 (see FIGS. 3A, 4A). The at least one canted portion 64 may be generated by slightly changing the cant or angle of the first web 52a and the second web 52b at one or more portions part way up a respective height of the first web 52a and the second web 52b. The at least one canted portion 64 may be integrally machined into the hat tool 88a (see FIG. 3B), 88b (see FIG. 4B). The at least one canted portion 64 may be an integral part of the hat stiffener 50 when the hat stiffener 50 is a composite material that is cured. Existing mandrel and hat stiffener autoclave curing processes or other suitable processes may be utilized to manufacture the at least one canted portion 64 for a hat stiffener 50 made of a composite material. The minor change in cant or angle in the first web 52a and the second web 52b of the hat stiffener 50 may substantially increase the stability of the first web 52a and the second web 52b of the hat stiffener 50 with very minimal material or weight difference. Further, the at least one canted portion 64 is preferably generated such that the hat stiffener 50 that is made of a composite material and undergoes a curing process may be easily removed from the hat tool 88a (see FIG. 6).

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A hat stiffener comprising:
   a cap;
   a first web and a second web extending from opposite ends of the cap, wherein the first web and the second web are non-linear and include two canted portions formed at first and second portions spaced apart from each other along a length of each of the first and second webs, the two canted portions dividing each of the first web and the second web into three individually linear sections, the linear sections being of substantially equal length and having a uniform thickness, and the hat stiffener defining a substantially hat-shaped cross-section configuration, the two canted portions each having a cant angle formed between the cap and each canted portion, the cant angle being greater than ninety (90) degrees; and,
   a first flange extending outwardly from a first web base portion and a second flange extending outwardly from a second web base portion.

2. The hat stiffener of claim 1 wherein the cant angle is between ninety (90) degrees and one-hundred eighty (180) degrees.

3. The hat stiffener of claim 1 wherein the hat stiffener is made of a material comprising a composite material, a metal material, or a combination thereof.

4. The hat stiffener of claim 1 wherein the cap has a cap angle formed between an interior surface of the hat stiffener at the cap and an interior surface of the hat stiffener at the first web, and wherein the cap angle is greater than the cant angle.

5. A hat stiffened panel structure for an aircraft, the structure comprising:
 a skin panel structure; and,
 a hat stiffener mounted to the skin panel structure, the hat stiffener comprising:
  a cap;
  a first web and a second web extending from opposite ends of the cap, wherein the first web and the second web are non-linear and include at least one canted portion, each of the at least one canted portion dividing each of the first web and the second web into two individually linear sections, the linear sections being of substantially equal length and having a uniform thickness; and,
  a first flange extending outwardly from a first web base portion and a second flange extending outwardly from a second web base portion.

6. The structure of claim 5 wherein the first web and the second web have one canted portion formed at a central portion along a length of each of the first and second webs.

7. The structure of claim 5 wherein the first web and the second web have two canted portions formed at first and second portions spaced apart from each other along a length of each of the first and second webs.

8. The structure of claim 5 wherein the at least one canted portion has a cant angle formed between the cap and the at least one canted portion, and further wherein the cant angle is greater than ninety (90) degrees.

9. The structure of claim 8 wherein the cant angle is between ninety (90) degrees and one-hundred eighty (180) degrees.

10. The structure of claim 5 wherein the hat stiffener is made of a material comprising a composite material, a metal material, or a combination thereof.

11. The structure of claim 5 wherein the hat stiffener defines a substantially hat-shaped cross-section configuration that improves stability, strength, and buckling resistance of the first web and the second web.

12. A hat stiffener comprising:
 a cap;
 a first web and a second web extending from opposite ends of the cap, wherein the first web and the second web are non-linear and include two canted portions formed at first and second portions spaced apart from each other along a length of each of the first and second webs, the two canted portions dividing each of the first web and the second web into three individually linear sections, the linear sections being of substantially equal length and having a uniform thickness, and the hat stiffener defining a substantially hat-shaped cross-section configuration, wherein the cap has a cap angle formed between an interior surface of the hat stiffener at the cap and an interior surface of the hat stiffener at the first web, and wherein the two canted portions each have a cant angle formed between the cap and each canted portion, and further wherein the cap angle is greater than the cant angle; and,
 a first flange extending outwardly from a first web base portion and a second flange extending outwardly from a second web base portion.

13. The hat stiffener of claim 12 wherein the cant angle is greater than ninety (90) degrees.

14. The hat stiffener of claim 12 wherein the cant angle is between ninety (90) degrees and one-hundred eighty (180) degrees.

15. The hat stiffener of claim 12 wherein the hat stiffener is made of a material comprising a composite material, a metal material, or a combination thereof.

16. The hat stiffener of claim 1 wherein the hat stiffener defines the substantially hat-shaped cross-section configuration that improves stability, strength, and buckling resistance of the first web and the second web.

* * * * *